United States Patent [19]

Shamah

[11] 4,286,497

[45] Sep. 1, 1981

[54] RATCHET-SECURABLE TOGGLE RETAINER

[76] Inventor: Alfred A. Shamah, P.O. Box 1589, York, Pa. 17405

[21] Appl. No.: 49,217

[22] Filed: Jun. 18, 1979

[51] Int. Cl.³ .............................................. F16B 21/00
[52] U.S. Cl. ..................................... 411/342; 411/345
[58] Field of Search ................... 85/3 R, 3 K, 3 S, 68, 85/80; 151/43

[56] References Cited

U.S. PATENT DOCUMENTS

| | | | |
|---|---|---|---|
| 2,398,220 | 4/1946 | Gelpcke | 85/3 K |
| 2,616,327 | 11/1952 | Karitzky | 85/3 |
| 3,581,347 | 6/1971 | Verspieren | 24/16 |
| 3,605,547 | 9/1971 | Millet | 85/3 S |
| 4,043,245 | 8/1977 | Kaplan | 85/3 R |
| 4,075,924 | 2/1978 | McSherry | 85/80 |

Primary Examiner—Casmir A. Nunberg
Attorney, Agent, or Firm—Stoll and Stoll

[57] ABSTRACT

In combination with a conventional toggle fastener adapted for insertion into and to secure behind a blind entry, a ratchet assembly adapted to retain the toggle fastener in the blind entry and to adjust for the depth of such entry, the ratchet assembly comprising at least one ratchet bar and a cooperating ratchet retainer adapted to slide on the ratchet bar. Excess length of the ratchet bar is removed to permit a conventional screw fastener to be engaged through the blind entry to the toggle wing assembly. The ratchet bar may be comprised of a ribbed construction, such as a saw-toothed surface, or a sequence of retaining openings therein.

4 Claims, 8 Drawing Figures

RATCHET-SECURABLE TOGGLE RETAINER

BACKGROUND OF THE INVENTION

The advantages of conventional toggle fasteners are well known. They are relatively economical to manufacture, simple to use, they are automatically self-adjusting for the depth of the blind entry through which they are placed (being similar to the thickness of the wall defining the blind entry) and they automatically adjust, within reasonable limits, to irregular seating surfaces. Thus, despite many varieties of blind entry fasteners, toggle fasteners continue to be popular.

The compensating ability of toggle fasteners to adjust for differing lengths of blind entries (thicknesses of walls) has been a function of the length of the screw element which may be as long as is reasonably necessary. However, a long screw has the disadvantage of requiring an installer to thread the toggle nut down a substantial and otherwise unnecessary length of screw shank, a particularly tedious operation if a long screw is used with a thin wall and if the installer is perched precariously and reaching inconveniently to the screw head. A greater disadvantage, and a functional limitation, of a long screw is the interference between a long screw and some member behind the blind entry, such as a second wall, or a wall stud, spaced a distance from the blind entry which is less than the length of the screw behind the toggle wings. In such a situation, the screw cannot be tightened to the extent necessary to secure a load to the toggle fastener. A further disadvantage of a long screw is its cost, which may not be insignificant in relation to the cost of the toggle fastener as a whole. A further disadvantage of the conventional toggle fastener is that the device being attached to the wall must be attached simultaneously with the bolt and attached toggle wing being inserted through the hole in the wall.

It is accordingly an object of the invention to provide a toggle fastener which uses a shorter than conventional screw. It is a further object of the invention to provide a toggle fastener which does not require lengthy and tedious tightening of an unnecessarily long screw in order to secure the fastener and its load to a wall. It is a further object of the invention to provide a toggle fastener in which the screw is unnecessary to initially retain the toggle wings behind a blind entry and in which the screw may be removed without losing the toggle wings in an inaccessible location.

Briefly, but not by way of limitation, the present invention provides at least one ratchet bar connecting between the toggle wings and a cooperating ratchet retainer, whereby the ratchet bar, in cooperation with the ratchet retainer, secures the toggle wings behind a blind entry without the need for the conventional screw. The retainer has the ability to "ratchet" the length of the ratchet bar, that is, move along the ratchet bar toward the toggle wings and lock in any position therealong without back-sliding, and thereby securing the toggle wings in position through and behind blind entries of varying depths without use of the screw, and permitting a shorter screw to be used for holding a load. The ratchet bar passes behind the trunnion nut of the toggle wing, and so maintains proper orientation toward the wall hole so that the bolt is readily threaded on the nut even if the interior of the wall is not parallel to the exterior surface.

BRIEF DESCRIPTION OF THE DRAWING

FIG. 5 is a view similar to that of FIG. 3, but showing the ratchet retainer and toggle wings held snuggly against the wall, the excess lengths of ratchet bars have been removed and the fastener is ready to receive the screw and load to be secured.

FIG. 8 is an exploded view of the toggle wings, ratchet-bar and ratchet-retainer shown in unassembled configuration.

DESCRIPTION OF A PREFERRED EMBODIMENT OF THE INVENTION

Figure 1:
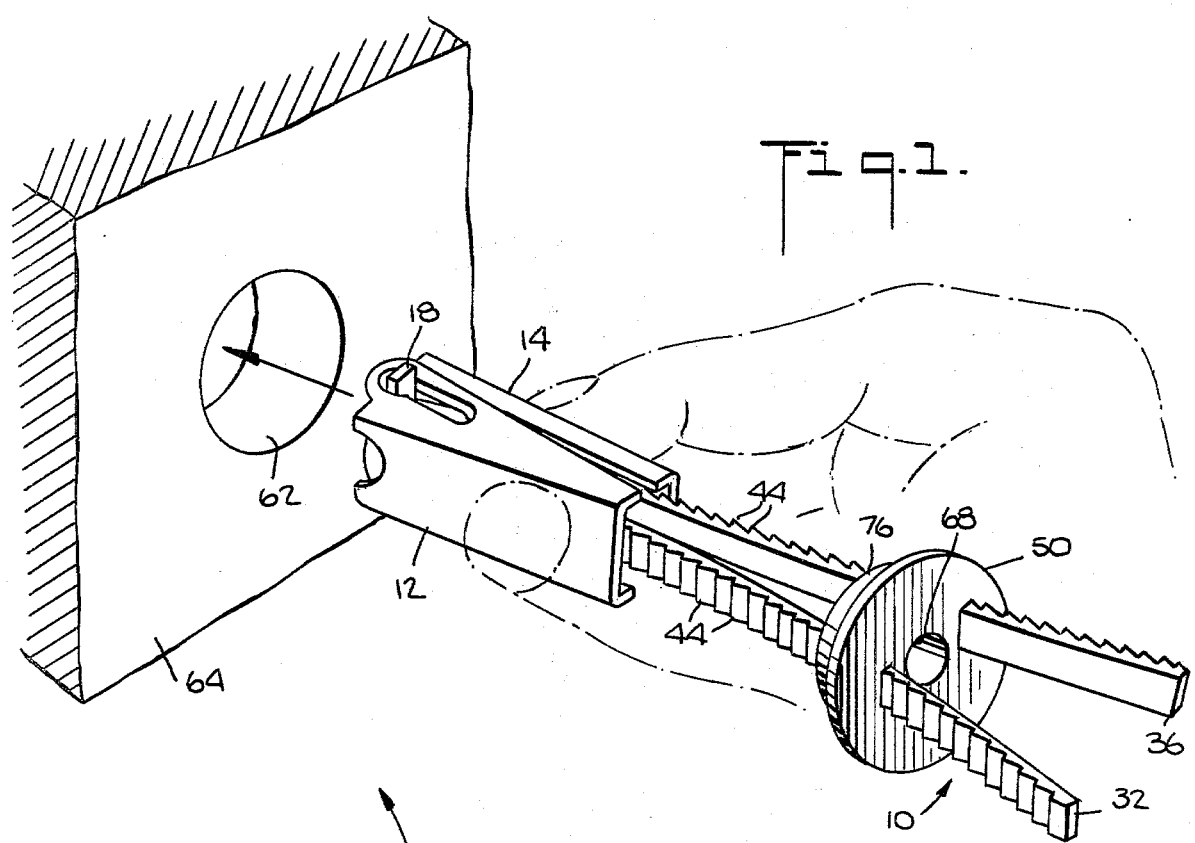
FIG. 1 is a perspective view of the ratchet-secured toggle fastener of the present invention shown being inserted into a blind entry.
Figure 2:
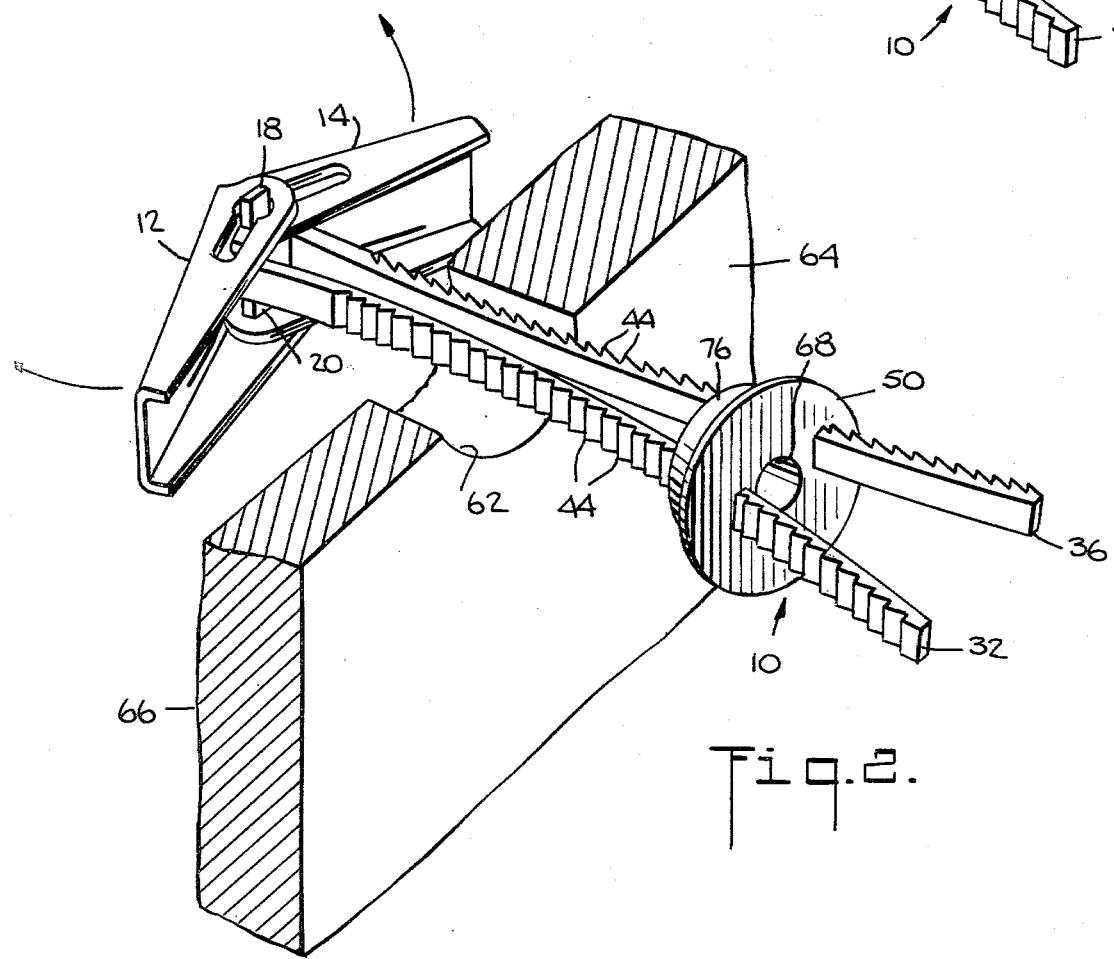
FIG. 2 is a perspective view of the toggle fastener of FIG. 1 shown after having been inserted into the blind entry, with the wall and blind entry being shown broken away for ease of viewing.
Figure 3:
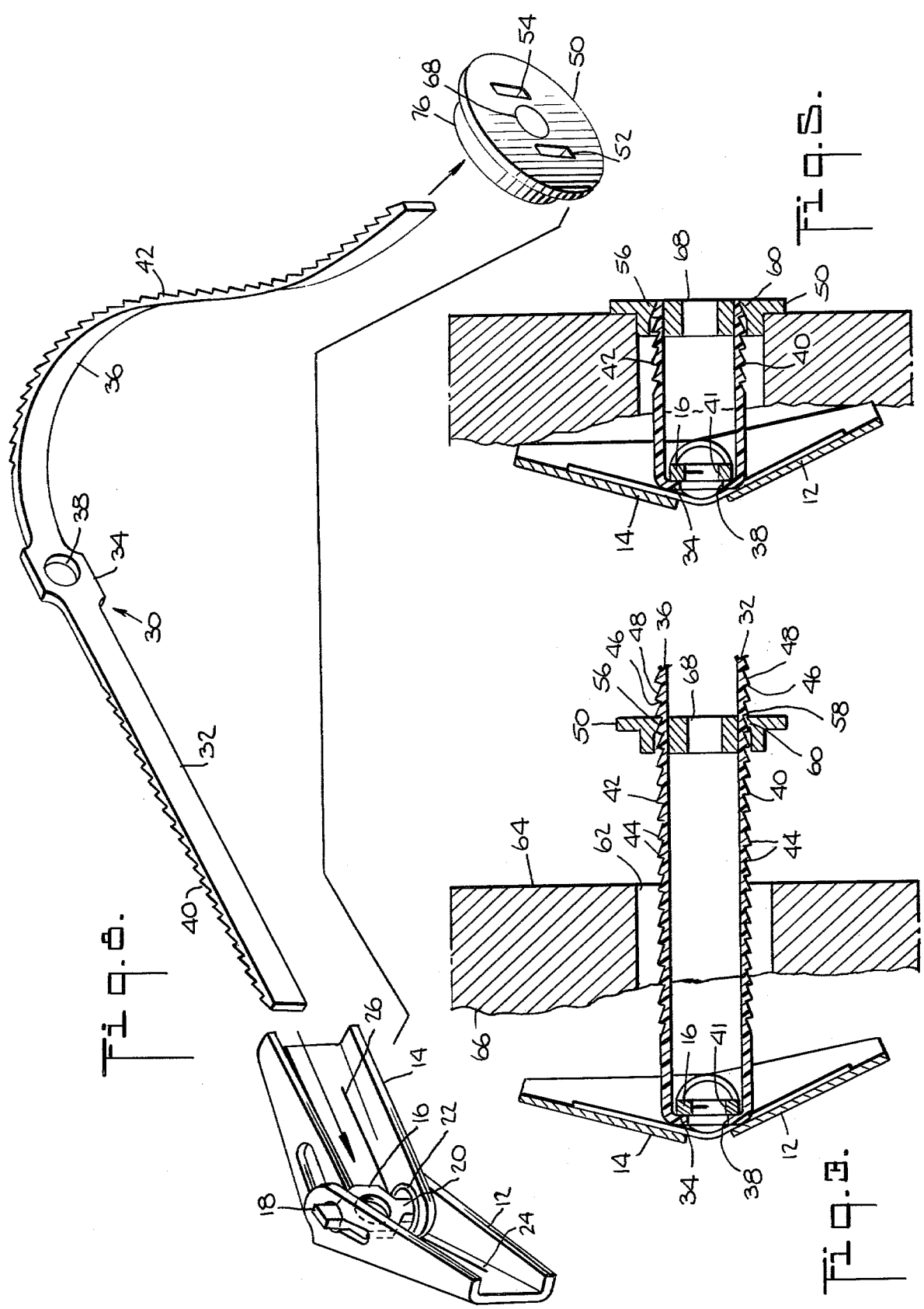
FIG. 3 is a top view, partly in section, of the toggle fastener shown in the approximate position as that shown in FIG. 2. The fastener has just been inserted through the blind entry, the toggle wings have expanded, but the ratchet retainer has not yet been secured along the ratchet bars.
Figure 4:
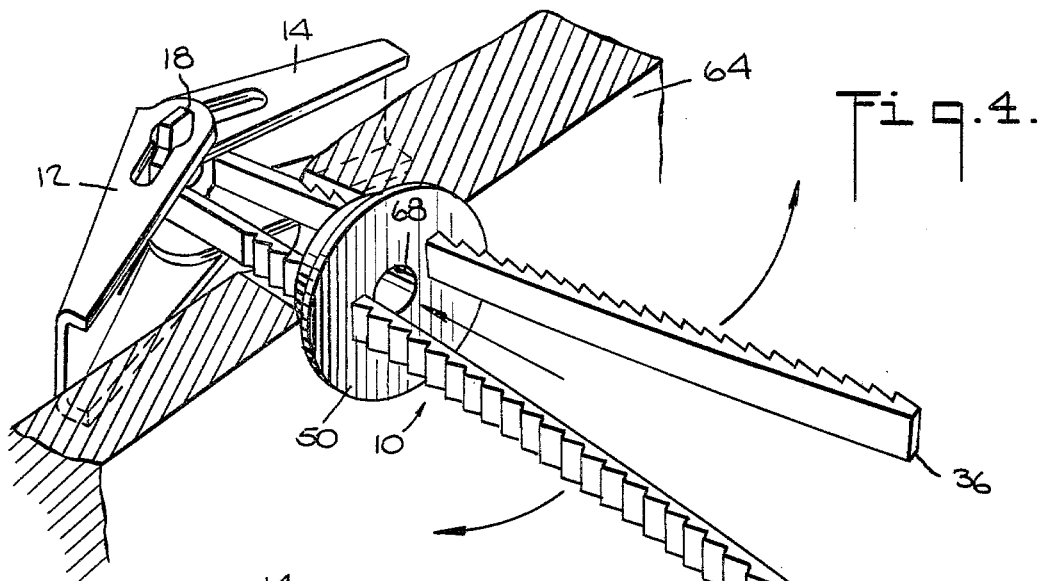
FIG. 4 is a perspective view of the ratchet fastener shown in FIG. 2, with the ratchet retainer being slid to the securing position along the ratchet bars. The toggle wings are shown engaged against the blind side of the wall, and the excess length of ratchet bars are being spread apart to snap off their excess length.

Referring to the drawing, the ratchet-secured toggle fastener 10 of the present invention comprises a pair of conventional opposed toggle wings 12 and 14 hinged to each other by a conventional toggle trunnion nut 16 having a pair of coaxial opposed trunnions 18 and 20 which act as hinge pins for toggle wings 12 and 14. Surrounding a trunnion of trunnion nut 16 is a coiled spring 22, the opposite ends 24 and 26 of which act as opposing springs to open the toggle wings 12 and 14, this also being a conventional arrangement.

A ratchet-securing member 30 comprises at least one ratchet bar 32 having a head 34 adapted to fit between trunnion nut 16 and toggle wings 12 and 14. In the preferred embodiment, ratchet-securing member 30 is provided with two ratchet arms 32 and 36 extending from opposite sides of head 34. Head 34 is provided with a centrally located hole 38 which is larger in diameter than the threaded hole 41 in trunnion nut 16. Ratchet arms 32 and 36 are formed integrally with head 34 to form a single unit, preferrably of a moldable plastic.

Ratchet arms 32 and 36 are each provided with at least one ribbed surface 40 and 42, respectively, and in the preferred embodiment as shown in the drawing the ribbed surfaces comprise a plurality of saw-toothed protruberances 44 directed toward head 34 such that the short sharp-angled side 46 of each saw-tooth faces toward head 34 while the longer more gently-angled side 48 of each saw-tooth is faced away from head 34. Adapted to slide over ratchet arms 32 and 36 is a ratchet retainer 50 which is provided with a pair of angled ratchet slots 52 and 54, each adapted to receive one of ratchet arms 32 and 36. Each of slots 52 and 54 is adapted to mate with the ribbed surfaces 40 and 42 of ratchet arms 32 and 36, respectively. In the preferred embodiment, wherein ribbed surfaces 40 and 42 are saw-toothed in shape, slots 52 and 54 of ratchet retainer 50 are each provided with a mating, oppositely directed saw-toothed bore 56. Saw-toothed bore 56 is unidirectional in that it admits a ratchet arm 32 or 36 in a first direction but prohibits withdrawing of such ratchet arm in the opposite direction. In particular, saw-toothed bore 56 is angled such that the shorter sharper-angled side 58 is disposed away from toggle wings 12 and 14 and the longer more gently-angled side of saw-toothed bore 56 is disposed toward toggle wings 12 and 14 whereby each saw-tooth in saw-toothed bore 56 engages the corresponding saw-teeth of ribbed surfaces 40 or 42 and prevents withdrawal of ratchet retainer 50 in a direction away from toggle wings 12 and 14. As shown in the drawing, slots 52 and 54 comprise only a single saw-tooth in the bore 56 of each but additional saw-teeth may be provided for additional holding power.

As may be seen in FIG. 8 of the drawing, ratchet-securing member 30 is disposed between trunnion nut 16 and toggle wings 12 and 14 with bore 38 defined in head 34 being substantially coaxially aligned with threaded hole 41 of trunnion nut 16. As is shown in FIG. 1 of the drawing, toggle wings 12 and 14 are manually drawn together for insertion into a blind hole 62 defined in wall 64, the rear side 66 of which is generally inaccessible from the front of the wall. Manually drawing toggle wings 12 and 14 together, to form a unit which can fit through hole 62, also brings ratchet arms 32 and 36 toward each other to a substantially parallel orientation extending out from toggle wings 12 and 14 in a direction away from wall 64. Ratchet arms 32 and 36 are slipped through slots 52 and 54, respectively, of ratchet-retainer 50, either before or after toggle wings 12 and 14 are inserted through hole 62. In the preferred embodiment, ratchet retainer 50 has a maximum diameter which is greater than the diameter of hole 62 so that the retainer cannot pass through hole 62.

Figure 6:
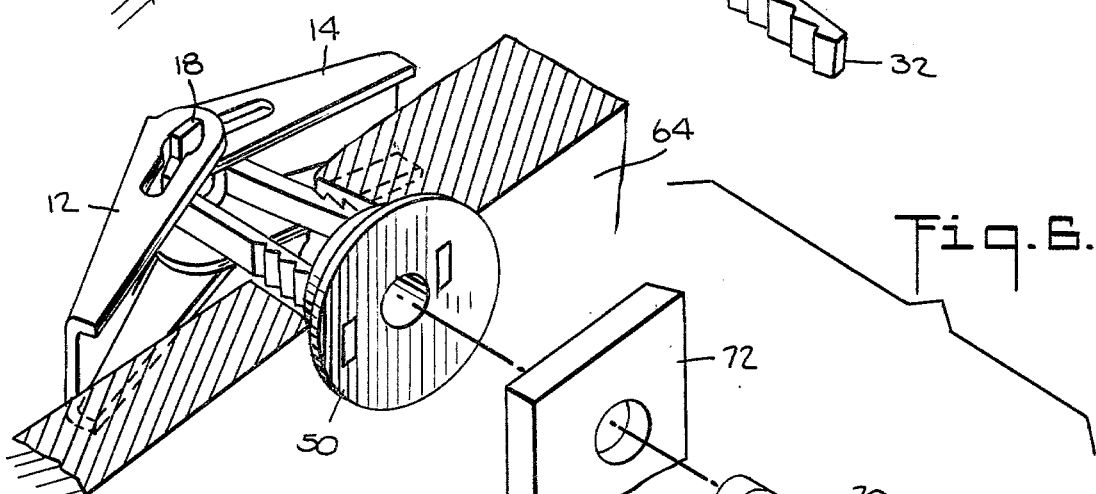
FIG. 6 is an exploded view showing the ratchet fastener as shown in FIG. 5 with the load and screw positioned for entry and fastened.
Figure 7:
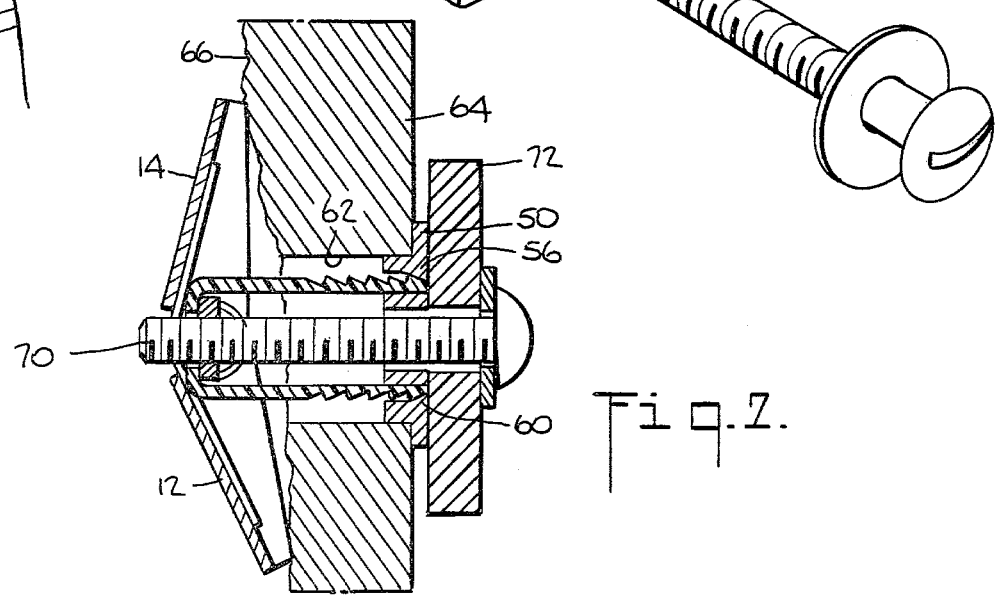
FIG. 7 is a view similar to that of FIG. 5, but showing the screw and load secured to the ratchet fastener in its final configuration.

With ratchet arms 32 and 36 being inserted through slots 52 and 54, respectively, and with toggle wings 12 and 14 being inserted through hole 62 and allowed to expand by virtue of spring 22 on the inaccessible side 66 of wall 64, ratchet-retainer 50 is slid on ratchet arms 32 and 36, drawing toggle wings 12 and 14 against walls 64 side 66, until the unit, comprised of toggle wings 12 and 14, ratchet securing member 30 and ratchet-retainer 50 is secure against wall 64. The excess lengths of ratchet arms 32 and 36, extending beyond ratchet-retainer 50 on the side thereof opposite wall 64, is then removed to yield the configuration shown in FIG. 5 with a hole 68, defined centrally in ratchet retainer 50, being substantially coaxially aligned with bore 38 of head 34 and threaded hole 41 of trunnion nut 16. As seen in FIGS. 6 and 7, a conventional screw 70 may be inserted through hole 68, and threaded into trunnion nut 16, finally extending out through bore 38 and between toggle wings 12 and 14, to secure a load 72 to wall 64 in the conventional manner by means of toggle fastener 10.

It will be seen that toggle fastener 10 is retained in wall 64 by means of ratchet securing member 30 and ratchet-retainer 50 without the need for screw 70. Accordingly, screw 70 may be removed and reinstalled at will, without losing toggle wings 12 and 14 behind wall 64, as is the problem with conventional toggle fasteners not having retaining means separate from screw 70.

Ratchet retainer 50 may be provided with a circumferential flange 74, the outer diameter of which is greater than the diameter of hole 62, and a circumferential rim 76, the diameter of which is intended to be substantially the same or slightly less than the diameter of hole 62 whereby rim 76 fits snugly into the bore of hole 62 while flange 74 seats ratchet retainer 50 against the surface of wall 64, to more precisely locate and retain ratchet retainer 50 in alignment with trunnion nut 16.

It has been indicated that the excess lengths of ratchet arms 32 and 36 are removed from the face of ratchet-retainer 50 opposite wall 64 as that excess length would interfere with securing load 72 by means of screw 70. In the preferred embodiment, ribbed surfaces 40 and 42 of ratchet arms 32 and 36, respectively, are formed, in conjunction with a plastic material of suitable brittleness, such that the excess lengths of ratchet arms 32 and 36 may simply be snapped off at positions close to ratchet-retainer 50. The thinner cross-section of each ratchet arm at the bottom of each saw-tooth aids in snapping-off excess ratchet arm lengths at the outer face of ratchet retainer 50 rather than at the thicker sections located near trunnion nut 16. of course, the excess lengths of ratchet arms 32 and 36 may always be sheared or manually cut.

The ability of ratchet securing member 30 and ratchet-retainer 50 to secure toggle wings 12 and 14 against the rear 66 of wall 64 is enhanced by the manner in which ratchet arms 32 can be held through and substantially parallel to hole 62 regardless of irregularities in the wall. While toggle wings 12 and 14 conventionally adjust to wall irregularities, there has been no convenient way to maintain trunnion nut 16 in proper alignment, that is with threaded hole 41 being substantially coaxial with hole 62 to facilitate proper threaded engagement with screw 70. This may be seen in FIG. 5. In conventional toggle fasteners, not only is trunnion nut 16 free to rotate when the screw is removed, but the entire toggle wing and nut assembly would normally fall away from hole 62 to an inaccessible location.

What is claimed is:

1. A toggle fastener, comprising:
   (a) toggle wings,
   (b) a trunnion nut, said trunnion nut hingedly securing said toggle wings,
   (c) a screw element,
   (d) ratchet-retaining means for securing the toggle wings to a wall,
   (e) said ratchet-retaining means comprising at least one ratchet-securing member and a retainer,
   (f) said ratchet-securing member extending between the trunnion nut and a wall-hole and engaging said trunnion nut to orient said trunnion nut with respect to the wall-hole,
   (g) said retainer being adjustably securable to said ratchet-securing member on the opposite side of the wall-hole from said toggle wings,
   (h) whereby said toggle wings are secured to the wall by said ratchet-securing member and said retainer, and the trunnion nut is axially aligned with the wall-hole by said ratchet-securing member for engagement with the screw element.

2. A toggle fastener in accordance with claim 1, wherein (a) said ratchet-securing member comprises a head portion located between the trunnion nut and the toggle wings and having a bore defined therein having a fixed relationship with respect to said trunnion nut, and at least one arm portion formed integrally with said head portion, (b) whereby the trunnion nut swivels with said head portion for axial alignment with the wall-hole.

3. A toggle fastener in accordance with claim 2, wherein (a) said ratchet-securing member further comprises at least one ratchet bar extending from said head portion (b) said ratchet bar having a ribbed surface adapted for sliding engagement with said retainer (c) whereby said retainer is securable to said ratchet bar along the ribbed length thereof.

4. A toggle fastener in accordance with claim 3, wherein (a) said ribbed surface of said ratchet bar comprises a plurality of saw-teeth angled toward said head portion, (b) said ratchet bar being breakable at each thin portion formed by said saw-teeth.

* * * * *